R. F. McCAMPBELL, G. H. SCOTT AND G. Q. SMITH.
FUNERAL AND BURIAL APPARATUS.
APPLICATION FILED SEPT. 11, 1916.
1,375,793.
Patented Apr. 26, 1921.
5 SHEETS—SHEET 2.
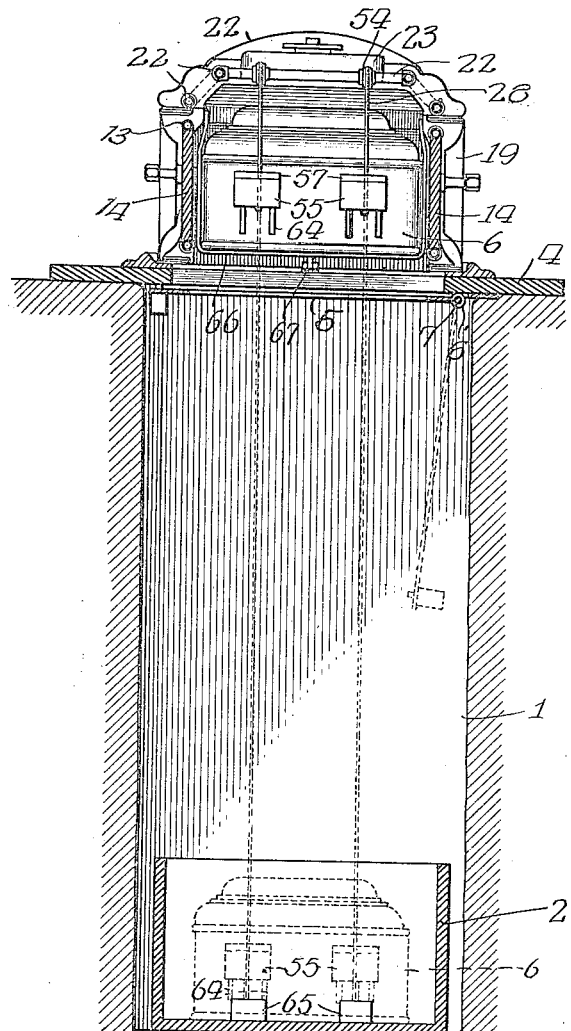
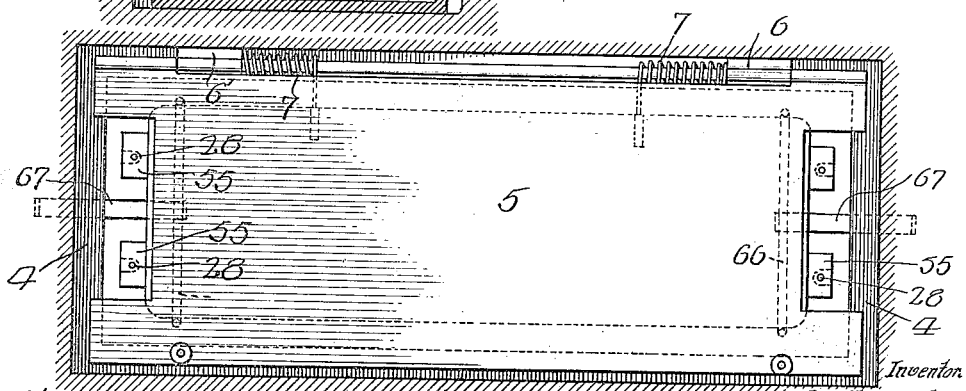

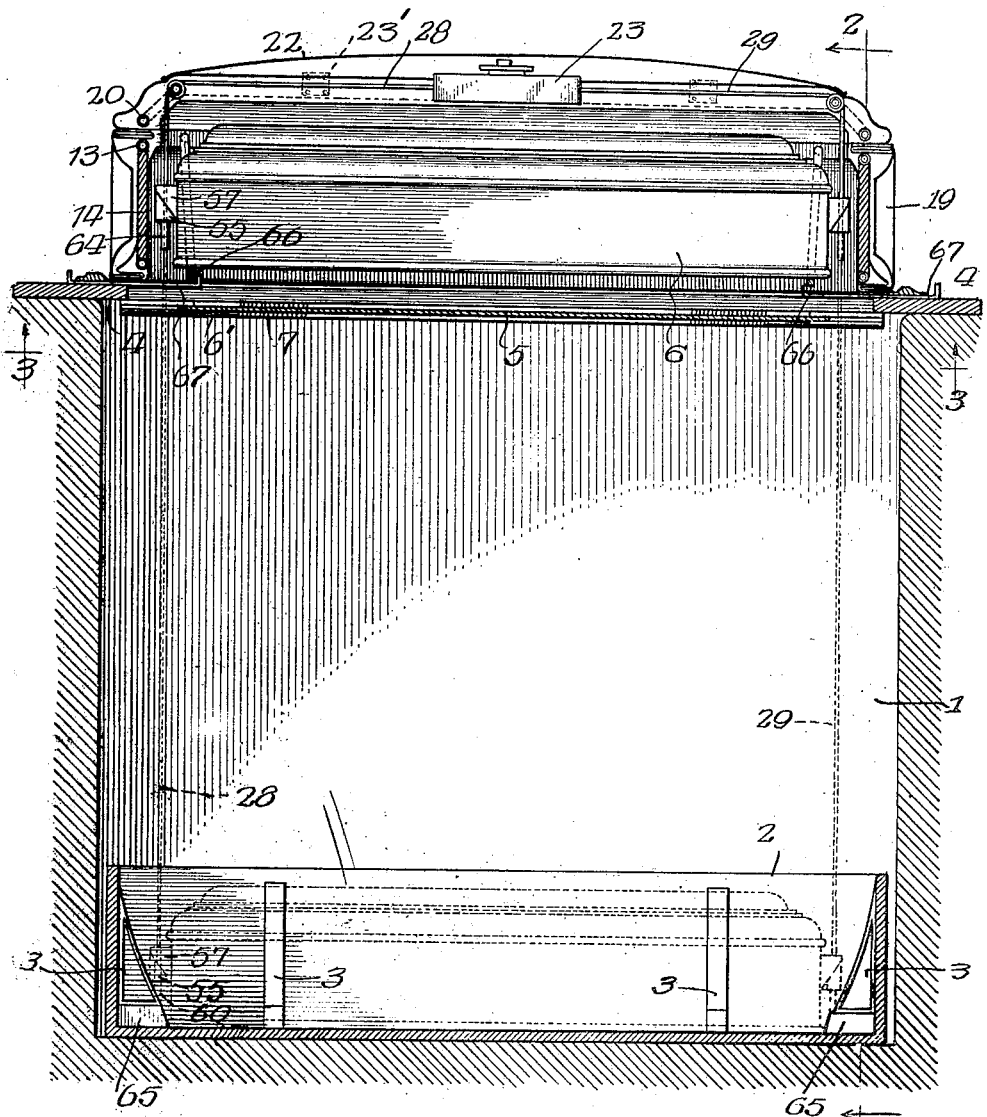

R. F. McCAMPBELL, G. H. SCOTT AND G. Q. SMITH.
FUNERAL AND BURIAL APPARATUS.
APPLICATION FILED SEPT. 11, 1916.
1,375,793.
Patented Apr. 26, 1921.
5 SHEETS—SHEET 3.
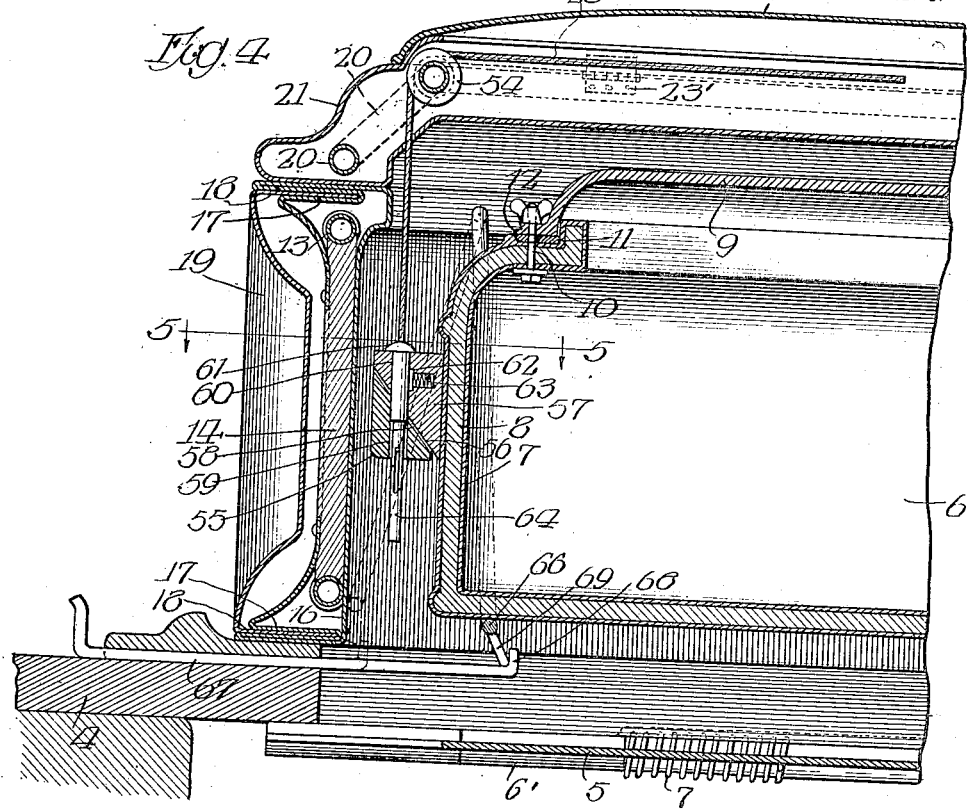
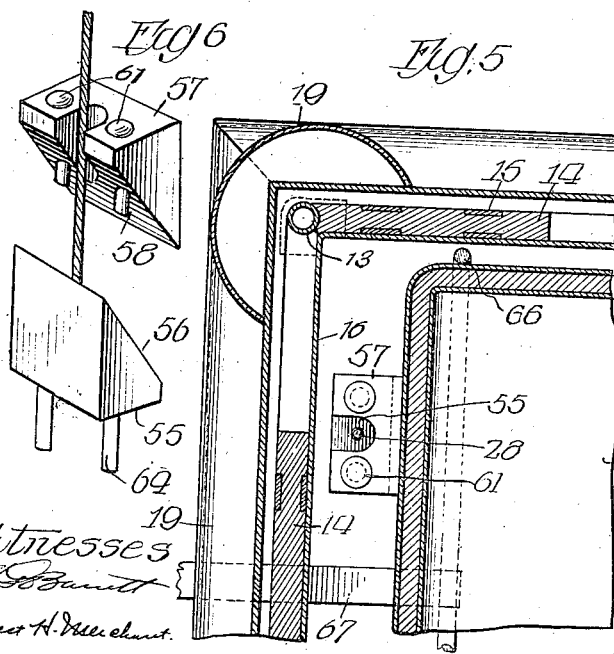
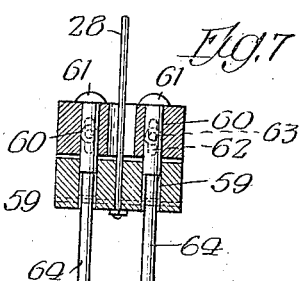
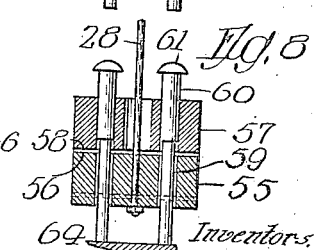

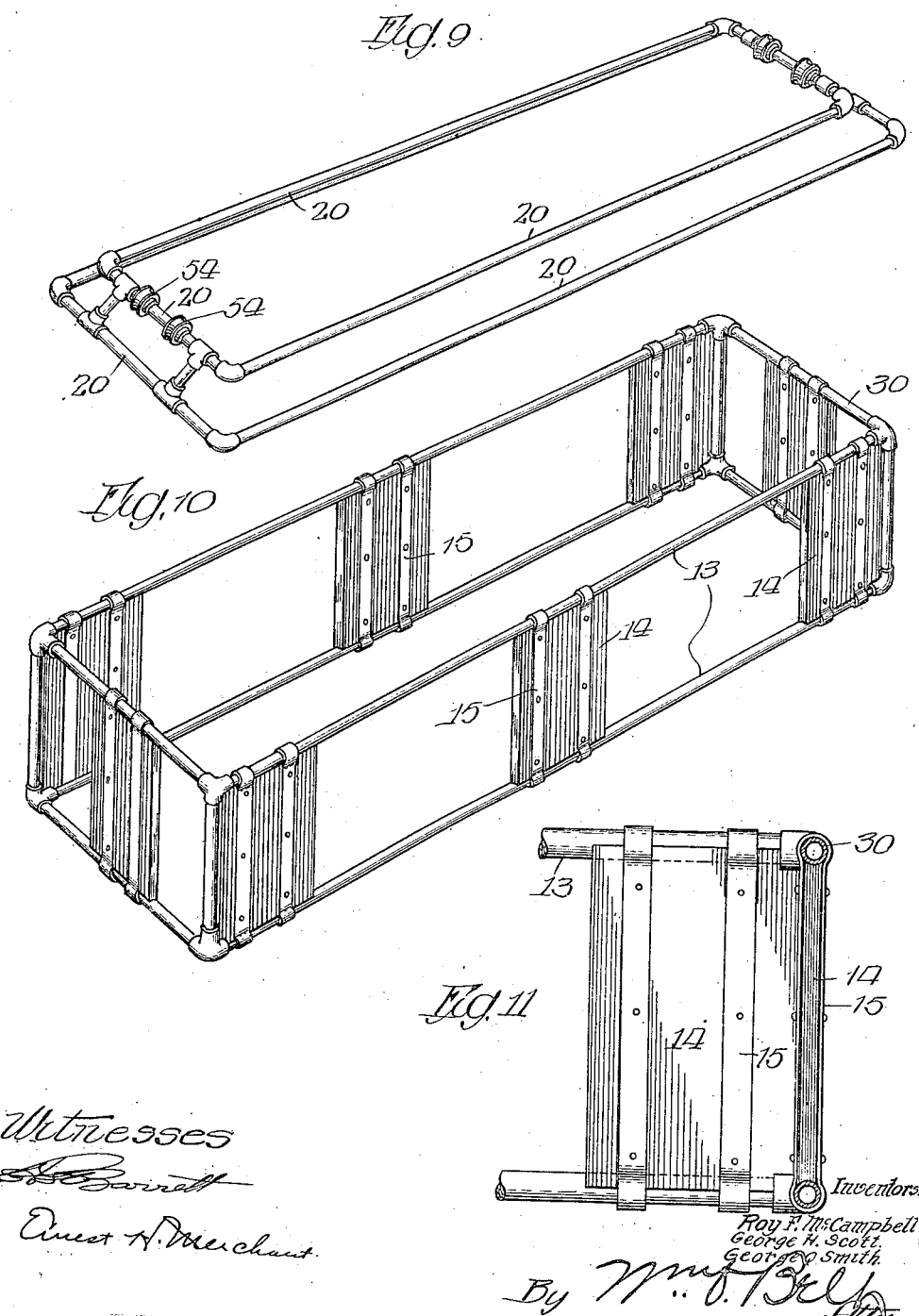

R. F. McCAMPBELL, G. H. SCOTT AND G. Q. SMITH.
FUNERAL AND BURIAL APPARATUS.
APPLICATION FILED SEPT. 11, 1916.
1,375,793.
Patented Apr. 26, 1921.
5 SHEETS—SHEET 5.
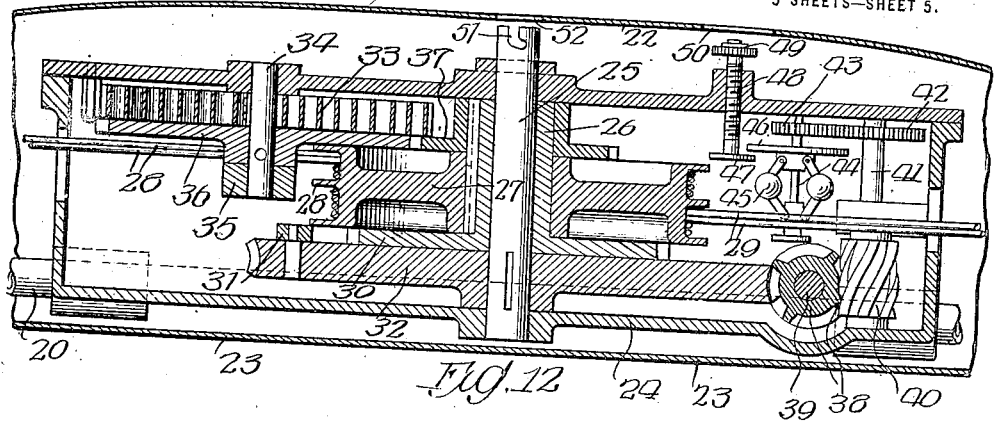
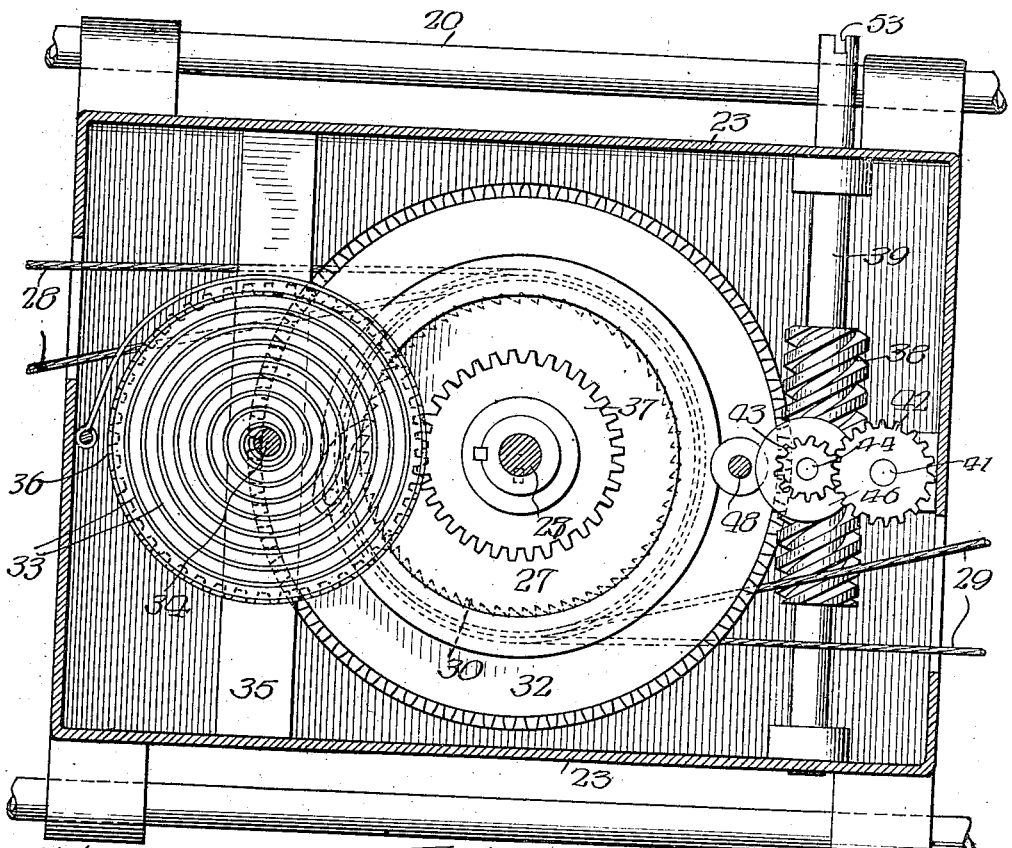

UNITED STATES PATENT OFFICE.

ROY F. McCAMPBELL, GEORGE H. SCOTT, AND GEORGE Q. SMITH, OF CHICAGO, ILLINOIS.

FUNERAL AND BURIAL APPARATUS.

1,375,793.   Specification of Letters Patent.   Patented Apr. 26, 1921.

Application filed September 11, 1916. Serial No. 119,416.

*To all whom it may concern:*

Be it known that we, ROY F. MCCAMPBELL, GEORGE H. SCOTT, and GEORGE Q. SMITH, citizens of the United States, residing at Chicago, in the county of Cook and State of Illinois, have invented certain new and useful Improvements in Funeral and Burial Apparatus, of which the following is a specification.

This invention relates to apparatus for facilitating the handling of the dead prior to and during interment.

Custom demands that a more or less ornate casket be provided for the reception of the body, entailing considerable expense which, once the casket is deposited in the grave, becomes a total loss so far as the protective function of the casket is concerned. Manufacturers of caskets sacrifice all other considerations to appearance and the usual result is a receptacle which rapidly disintegrates when subjected to the conditions of the grave. Furthermore, while mechanical devices have heretofore been employed to lower the casket into the grave their use is accompanied with certain disadvantages such for example as the difficulty of releasing the casket from and rewinding the supporting means therefor.

It is an object of our invention to provide a casket temporarily maintained within an outer shell which may be ornamented in any desirable manner and which supports means for lowering the casket into the grave.

A further object of our invention is the provision in the above-described structure of means for automatically releasing and rewinding the lowering means when the casket reaches its final resting place in the grave.

A further object of our invention is the provision of means whereby relatives and friends of the deceased are prevented from seeing the descent of the casket into the grave and the grave is closed continuously during interment.

A further object of our invention is the provision of means whereby the body may be deposited in a casket, hermetically sealed if desired, substantial in construction, and without unnecessary ornamentation and therefore relatively inexpensive, which, however, by reason of its temporary inclosure in an outer ornamented shell, is adapted to satisfy the dictates of custom.

A still further object of our invention is the provision of an outer shell adapted to inclose a casket and constructed to permit variation of the decorative effect.

Further objects and advantages of our invention will be apparent as it is better understood by reference to the following specification when read in connection with the accompanying drawing, illustrating a preferred embodiment thereof, in which—

Figure 1 is a longitudinal section through a grave containing the rough box and with the casket and inclosing shell disposed thereabove;

Fig. 2 is a section on the line 2—2 of Fig. 1;

Fig. 3 is a section on the line 3—3 of Fig. 1;

Fig. 4 is an enlarged detail in section through one end of the casket and inclosing shell;

Fig. 5 is a section on the line 5—5 of Fig. 4;

Fig. 6 is a detail in perspective of the automatically releasable connections between the casket and the supporting cables;

Fig. 7 is a detail in section illustrating the automatically releasable connections with the parts in locking position;

Fig. 8 is a similar view illustrating the releasing position of the parts;

Fig. 9 is a detail in perspective of the frame supporting the cover of the outer shell;

Fig. 10 is a detail in perspective of the frame of the outer shell;

Fig. 11 is an elevation, partially in section of a portion of the frame illustrated in Fig. 10;

Fig. 12 is a longitudinal section through the means for controlling the lowering of the casket; and Fig. 13 is a plan view of the structure illustrated in Fig. 12 with the inclosing casing in section.

Referring to the drawing, 1 indicates the grave which may, by reason of the smaller dimensions of the casket employed, be somewhat smaller than is usual. Within the grave is disposed a rough box 2 having a plurality of guides 3 to center the casket as it descends therein. Above the grave a green-board 4 is arranged having an opening sufficient to permit the passage of the casket therethrough which is normally closed by a door 5 hinged to the green board at 6 and normally biased to closed position by springs 7. The grave when once prepared is closed by the green-board 4 and its door 5 until the former is finally removed to permit filling of the grave.

We contemplate the replacement of caskets of the usual form by an unornamented casket 6 as illustrated in the drawing, the details of one form of the casket being shown in Figs. 4 and 5. The casket 6 may be an inexpensive wooden box, especially where the body is to be cremated, or it may be constructed of wood of a more expensive character but for interment it is preferably of metal. In Figs. 4 and 5 we illustrate a casket constructed of sheet metal 7 between the layers of which a suitable filling 8 is disposed, the filling being adapted to stiffen the structure. A metal cover 9 closes the casket 6, being secured thereto by bolts 10. A gasket 11 of suitable material is preferably disposed between the edges of the cover 9 and the body of the casket 6 and the cover 9 may be soldered at 12 to the body of the casket 6 to insure that the latter is hermetically sealed.

Inclosing the casket 6 is a shell including a frame preferably constructed of tubular members 13 between which at intervals wood blocks 14 are disposed to provide a base to which the handles may be secured. Straps 15 disposed in grooves in the blocks 14 and embracing opposite members 13 securely hold the blocks in position. The blocks 14 strengthen the frame. Secured to the blocks 14 are sheet metal members 16 forming the inner lining of the shell and bent adjacent the upper and lower edges of the frame (Fig. 4) to form grooves 17 adapted to receive the flanges 18 of plates 19 which form the outer or decorative portion of the shell. Obviously the decorative design of the plates 19 may be widely varied and, the plates 19 being interchangeable, the appearance of the shell may be changed to conform to individual ideas, it being understood that the undertaker may be furnished by the manufacturer with a plurality of plates 19 of different design.

The upper portion or cover of the shell includes a frame constructed of tubular members 20, and a decorative sheet metal plate 21 supported on this frame. The cover is preferably hingedly connected to the body of the shell although obviously no hinges are necessary. The top 22 of the cover is connected by hinges 23' to the plate 21 so that access may be readily had to the mechanism presently to be described.

A casing 23 is supported by the tubular members 20 of the cover frame and within this casing the mechanism for controlling the lowering of the casket 6 is disposed. This mechanism comprises a frame 24 in which a main shaft 25 is journaled. Loosely mounted on the shaft 25 is a sleeve 26 having a drum 27 secured thereto, the surface of the drum being divided by a flange 28 into two sections to receive, respectively, the cables 28 and 29 leading to opposite ends of the shell. A ratchet 30 is secured to the sleeve 26 and engages a pawl 31 mounted on a worm gear 32 which is fast to the shaft 25. The relation of the pawl 31 and ratchet 30 is such that when the cables 28 and 29 are unwound from the drum 27 the worm gear 32 will be rotated but when the drum 27 is moved in the opposite direction to rewind the cables it rotates freely with respect to the worm gear 32. The rewinding of the cables 28 and 29 is accomplished by a spring 33 disposed about a shaft 34 which is journaled in the frame 24 and in a bracket 35 mounted thereon. The spring 33 is disposed between the frame 24 and a gear 36 fast to the shaft 34 and is connected at one end to the frame 24 and at the other to the shaft 34. The gear 36 meshes with a pinion 37 secured to the sleeve 26 and consequently when the drum 27 is rotated by the unwinding of the cables the spring 33 is wound. When the cables are released in the manner presently to be described the drum 27 will be rotated in a reverse direction to rewind the cables. The worm gear 32 meshes with a worm 38 on the shaft 39 which in turn meshes with a worm 40 on a shaft 41 carrying a gear 42 which meshes with a pinion 43 on the governor shaft 44. A ball governor 45 of usual construction is supported on the shaft 44 and is connected to a brake-disk 46 adapted to engage a stop 47 at the end of a screw 48 threadedly mounted in the frame 24. The screw 48 is provided with suitable operating means 49 disposed beneath an opening 50 in the top 22 of the cover so that the screw may be readily operated to lock or release the mechanism as desired. When the mechanism is in operation the speed at which the drum 27 is allowed to rotate is controlled by the governor 45. The shaft 25 is provided with a slot 51 in its end beneath an opening 52 in the top 22 of the cover so that by insertion of a suitable operating member the shaft 25 may be rotated to rewind the cables 28 and 29 should the spring 33 fail to perform its function. The shaft 39 projects beyond the casing 23 and is similarly provided with a slot 53 adapted to receive a suitable operating member whereby the worm gear 32 and the drum 27 may be rotated to tension the cables 28 and 29 prior to lowering the casket 6. In this instance power is applied to the shaft 39 because of the weight on the cables 28 and 29 which would render it difficult to rotate the shaft 25 directly.

The cables 28 and 29 extend over rollers 54 supported on the end members 20 of the cover frame and downwardly within the shell. At their ends the cables 28 and 29 are provided with blocks 55 having sloping faces 56 and complementary blocks 57 having sloping faces 58 are secured to the ends of the casket 6. The blocks 55 and 57 are provided with registering openings 59 and 60 adapted to receive pins 61 frictionally engaged by members 62 at the ends of springs 63 disposed in suitable sockets in the blocks 57. Pins 64 are loosely held within the openings 59 and depend from the blocks 55. Abutments 65 are arranged in the bottom of the rough box 2 in position to be engaged by the pins 64 when the casket has been seated within the rough box. The pins 64 are lifted sufficiently to raise the pins 61 from engagement with the blocks 55 so that the blocks 55 and 57 are no longer connected and owing to the sloping faces 56 and 57 the tension of the spring 33 on the cables 28 and 29 frees the blocks 55 from the blocks 57 and permits the cables to be rewound leaving the casket 6 in the rough box 2.

To support the casket 6 within the shell we provide a pair of stirrups 66 pivotally mounted in the shell and adapted to be normally positioned as indicated in full lines in Fig. 4. Obviously before the casket can be lowered the stirrups 66 must be removed and this may be accomplished by means of sliding members 67 supported on the green-board 4 and provided with hooked ends 68 adapted to engage projections 69 on the stirrups 66. By operating the sliding members 67 the stirrups 66 may be withdrawn to the position indicated in dotted lines in Fig. 4. Before withdrawal of the stirrups 66 the cables 28 and 29 are tensioned by rotating the shaft 39 to relieve the stirrups 66 of the weight of the casket 6. This may be done at the grave or prior to removal of the casket and inclosing shell from the place where the funeral services are held.

The mode of operation of our invention will be readily understood from the following brief description thereof. The body is placed in the casket 6 which is disposed within the shell and is supported on the stirrups 66, in which position it is securely held. At the grave the shell and casket are arranged on the green board with the stirrups resting in the sliding members 67, then the cables 28 and 29 are tensioned to raise the casket 6 slightly by operating the shaft 39 after which the stirrups 66 are withdrawn. The operator then manipulates the screw 48 to release the brake and the casket 6 descends gradually under the control of the governor 45 passing the door 5 which opens automatically and closes immediately after the casket has passed. When the casket reaches and seats itself in the rough box 2 the cables 28 and 29 are automatically released by engagement of the pins 64 with the blocks 65 and are rewound by the spring 33. The shell may then be removed and interment other than the filling of the grave is complete.

It will be noted that throughout the operation the grave is concealed, being closed by the green-board 4 and the door 5 after removal of the shell. Consequently the shock to the relatives and friends which usually accompanies the lowering of the casket into the grave is materially lessened. Because the casket is always concealed it may be sturdily constructed of materials best adapted to give protection to the body and no expense need be wasted on unnecessary decoration. All of the decoration required by custom is applied to the shell which is used repeatedly and consequently the expense which any individual is required to bear may be materially reduced. Furthermore the casket 6 need not be as large as caskets of the usual type, it being our intention that the shell be substantially of the size of caskets now commonly used. The casket is of sufficient size to accommodate the body and the grave and rough box may be smaller than is now usual. Considerable time is saved at the grave and the work of lowering the casket is accomplished much more readily than is possible with devices now known and used. Where lowering devices are now used it is customary to send them to the grave before the funeral arrives and an assistant must necessarily accompany the apparatus to see that it is in proper working condition, whereas with our apparatus the lowering means is entirely within the shell and always under the supervision of the person conducting the funeral.

It will be apparent that various changes may be made in the form, construction and arrangement of the parts without departing from the spirit and scope of the invention or sacrificing any of its material advantages, the form hereinbefore described being merely a preferred embodiment thereof.

We claim:

1. In an apparatus of the character described, the combination of a shell open at the bottom and having a hollow cover, a casket supported within said shell, flexible lowering means connected to the ends of the casket, and means supported within said cover for controlling the lowering means.

2. In an apparatus of the character described, the combination of a shell, a casket, a pair of stirrups pivotally mounted in said shell to support the casket within the shell, and means for swinging said stirrups outwardly from beneath the casket.

3. In an apparatus of the character described, the combination of a shell, a casket, a pair of stirrups pivotally suspended from said shell to support the casket within the shell, and sliding members operable from without the shell and engaging the stirrups to swing them from beneath the casket.

4. In an apparatus of the character described, the combination of a shell comprising a skeleton frame and including a movable cover portion, a covering for the sides, ends and top of said frame, a casket, means for supporting the casket within the shell, flexible lowering means connected to the casket and engaged with said frame, and means supported within the cover portion for controlling said lowering means.

5. In an appaartus of the character described, an open bottom shell comprising a skeleton frame, an inner lining for said frame, an outer lining for the frame separate from said inner lining and in engagement therewith, and a cover.

6. In an apparatus of the character described, an open bottom shell comprising a skeleton frame, a skeleton top for said frame, metal members secured to the frame forming an inner lining therefor, metal plates separate from the inner lining and forming a decorative facing for the frame, and a decorative covering for said top.

7. In an apparatus of the character described, the combination of an open bottom shell, a casket supported within the shell, blocks on the end of the casket, flexible lowering means, blocks on the ends of said flexible lowering means, said blocks having oppositely disposed inclined faces and alined openings, pins yieldingly mounted in the openings in the blocks on the casket and engaging the openings in the blocks on the lowering means, and means for disengaging said pins from the blocks on the lowering means when the casket has reached the limit of its lowering movement.

8. In an apparatus of the character described, the combination of a casket, a shell surrounding said casket, cables connected to said casket, a hollow cover for said shell, means supported within said cover to gradually pay out said cables whereby said casket is lowered, and means to automatically release said cables from said casket when the latter has reached the limit of its downward travel.

9. In an apparatus of the character described, the combination of a casket, a shell surrounding said casket, cables connected to said casket, a hollow cover for said shell, means supported within said cover to gradually pay out said cables whereby said casket is lowered, means to automatically release said cables from said casket when the latter has reached the limit of its downward travel, and means for automatically rewinding said cables.

10. In an apparatus of the character described, the combination of a casket, means for lowering said casket, and means for releasing said lowering means from said casket when the latter reaches the limit of its downward travel, including complementary blocks secured respectively to said casket and lowering means and provided with sloping faces, registering openings in said blocks, pins in said openings, and means for disengaging said pins from the blocks on said lowering means.

11. In an apparatus of the character described, the combination of a casket, a rough box, means for lowering said casket into said rough box, and means for releasing said lowering means from said casket when the latter reaches the limit of its downward travel, including complementary blocks secured respectively to said casket and lowering means and provided with sloping faces, registering openings in said blocks, pins in said openings connecting said blocks, pins loosely disposed in the openings in the blocks connected to said lowering means, and abutments in said rough box adapted to be engaged by said last-mentioned pins.

12. In an apparatus of the character described, the combination of a casket, and a shell surrounding said casket comprising a frame and separate plates forming the outer surface of said shell.

ROY F. McCAMPBELL.
GEORGE H. SCOTT.
GEORGE Q. SMITH.

Witnesses:
M. A. KIDDIE,
ERNEST H. MERCHANT.